(12) United States Patent
Liu et al.

(10) Patent No.: US 6,600,582 B1
(45) Date of Patent: *Jul. 29, 2003

(54) OPTICAL ADD/DROP WAVELENGTH SWITCH

(75) Inventors: Jian-Yu Liu, Boulder, CO (US); Kuang-Yi Wu, Boulder, CO (US)

(73) Assignee: Chorum Technologies LP, Richardson, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 09/715,603

(22) Filed: Nov. 17, 2000

Related U.S. Application Data

(63) Continuation of application No. 09/036,202, filed on Mar. 6, 1998, now Pat. No. 6,166,838.
(60) Provisional application No. 60/042,373, filed on Mar. 24, 1997.

(51) Int. Cl.[7] ............................................. H04J 14/02
(52) U.S. Cl. ..................... 359/124; 359/122; 359/128
(58) Field of Search ............................... 359/122, 124, 359/127, 128

(56) References Cited

U.S. PATENT DOCUMENTS 3,501,640 A    3/1970  Harris ........................ 250/199

(List continued on next page.)

FOREIGN PATENT DOCUMENTS

| EP | 0 762 690 A2 | 3/1997 |
| EP | 0 905 936 A2 | 3/1999 |
| WO | WO 97/09536  | 3/1997 |
| WO | WO 98/47254  | 10/1998 |

OTHER PUBLICATIONS

Carlsen et al.; "Flat Passband Birefringent Wavelength–Division Multiplexers"; Electronic Letters, vol. 23, 1987; pps. 106–107.

Fujii et al.; "Wavelength–Division Multi/Demultiplexer Utilizing Optically Active Crystals"; Journal of Lightwave Technology, vol. 8, No. 7, Jul. 1990; pps. 1051–1054.

Ishio et al.; "Review and Status of Wavelength–Division–Multiplexing Technology and Its Application"; Journal of Lightwave Technology; vol. LT–2, No. 4, Aug. 1984; pps. 448–463.

(List continued on next page.)

Primary Examiner—Leslie Pascal
(74) Attorney, Agent, or Firm—Baker Botts L.L.P.

(57) ABSTRACT

An optical add/drop wavelength switch is controllably changed from a bridge state, in which output is identical to input, e.g. a Wavelength Division Multiplexed (WDM) input, and an add/drop state, In which a signal input to an add port is substituted for a particular wavelength subrange of the WDM input, other wavelengths of the WDM input being unchanged. In one embodiment, the wavelength subrange of the WDM signal is given a polarization different from other wavelengths of the WDM, such as by using a stacked waveplate or other optical filter or polarization discriminator. The differently-polarized wavelengths can the be spatially separated, e.g. by a birefringent element or a polarization beam splitter, preferably In a bit-controlled fashion, such as by using a liquid crystal or other polarization controller. Polarization controllers and discriminators can be used similarly to selectably align or combine the add signal with the portion of the WDM signal outside the subrange. The add/drop wavelength switch can be used, e.g. In an optical token ring network and/or to make-up an optical crossbar for exchanging any arbitrarily designatable channels, e.g. among a plurality of multi-channel optical fibers.

45 Claims, 9 Drawing Sheets

U.S. PATENT DOCUMENTS

| | | | |
|---|---|---|---|
| 4,019,807 A | 4/1977 | Boswell et al. | 350/160 |
| 4,039,252 A | 8/1977 | Mizuno et al. | 350/160 |
| 4,378,955 A | 4/1983 | Bleha, Jr. et al. | 350/334 |
| 4,461,543 A | 7/1984 | McMahon | 350/383 |
| 4,516,837 A | 5/1985 | Soref | 350/347 |
| 4,566,761 A | 1/1986 | Carlsen et al. | 350/401 |
| 4,650,289 A | 3/1987 | Kuwahara | 350/375 |
| 4,685,773 A | 8/1987 | Carlsen et al. | 350/401 |
| 4,720,171 A | 1/1988 | Baker | 350/331 |
| 4,737,003 A | 4/1988 | Matsumura et al. | 350/96.14 |
| 4,893,931 A | 1/1990 | Lefevre et al. | 356/351 |
| 4,896,947 A | 1/1990 | Leenhouts | 350/337 |
| 4,919,522 A | 4/1990 | Nelson | 359/246 |
| 4,952,030 A | 8/1990 | Nakagawa et al. | 350/337 |
| 4,989,941 A | 2/1991 | Soref | 350/96.18 |
| 4,999,619 A | 3/1991 | Te Velde | 340/784 |
| 5,013,140 A | 5/1991 | Healey et al. | 350/347 |
| 5,105,289 A | 4/1992 | Sonehara et al. | 359/70 |
| 5,162,944 A | 11/1992 | Yamamoto et al. | 359/247 |
| 5,165,104 A | 11/1992 | Weverka | 385/7 |
| 5,185,824 A | 2/1993 | Grimes et al. | 385/24 |
| 5,305,136 A | 4/1994 | Smith | 359/247 |
| 5,317,658 A | 5/1994 | Bergland et al. | 385/16 |
| 5,363,228 A | 11/1994 | DeJule et al. | 359/117 |
| 5,381,250 A | 1/1995 | Meadows | 359/39 |
| 5,414,540 A | 5/1995 | Patel et al. | 359/39 |
| 5,477,350 A | 12/1995 | Riza et al. | 359/39 |
| 5,526,153 A | 6/1996 | Glance | 359/127 |
| 5,555,113 A | 9/1996 | Mulkens et al. | 359/63 |
| 5,596,661 A | 1/1997 | Henry et al. | 385/24 |
| 5,623,360 A | 4/1997 | Gesell et al. | 359/287 |
| 5,680,490 A | 10/1997 | Cohen et al. | 385/24 |
| 5,692,077 A | 11/1997 | Stone et al. | 385/16 |
| 5,694,233 A | 12/1997 | Wu et al. | 359/117 |
| 5,712,704 A | 1/1998 | Martin et al. | 356/351 |
| 5,724,165 A | 3/1998 | Wu | 359/117 |
| 5,726,723 A | 3/1998 | Wang et al. | 349/75 |
| 5,740,288 A | 4/1998 | Pan | 385/11 |
| 5,751,454 A * | 5/1998 | MacDonald et al. | 359/110 |
| 5,771,320 A | 6/1998 | Stone | 385/16 |
| 5,809,190 A | 9/1998 | Chen | 385/43 |
| 5,854,666 A | 12/1998 | Fujimaki | 349/180 |
| 5,867,291 A | 2/1999 | Wu et al. | 359/124 |
| 5,870,164 A | 2/1999 | Lu et al. | 349/180 |
| 5,877,876 A | 3/1999 | Birdwell | 359/39 |
| 5,883,687 A | 3/1999 | Lu et al. | 349/201 |
| 5,912,748 A | 6/1999 | Wu et al. | 359/117 |
| 5,933,207 A | 8/1999 | Wu | 316/99 |
| 5,936,697 A | 8/1999 | Yang | 349/180 |
| 5,943,151 A | 8/1999 | Grasso et al. | 359/161 |
| 5,946,116 A | 8/1999 | Wu et al. | 359/117 |
| 5,963,291 A | 10/1999 | Wu et al. | 349/196 |
| 5,978,116 A | 11/1999 | Wu et al. | 359/124 |
| 6,005,697 A | 12/1999 | Wu et al. | 359/117 |
| 6,067,178 A | 5/2000 | Zheng | 359/124 |
| 6,084,694 A * | 7/2000 | Milton et al. | 359/124 |
| 6,094,246 A | 7/2000 | Wong et al. | 349/99 |
| 6,097,451 A | 8/2000 | Palmer et al. | 349/14 |
| 6,097,518 A * | 8/2000 | Wu et al. | 359/122 |
| 6,111,625 A | 8/2000 | Ohta et al. | 349/141 |
| 6,130,971 A | 10/2000 | Cao | 385/31 |
| 6,134,358 A | 10/2000 | Wu et al. | 385/16 |
| 6,137,604 A | 10/2000 | Bergano | 359/124 |
| 6,137,606 A | 10/2000 | Wu et al. | 359/124 |
| 6,141,076 A | 10/2000 | Liu et al. | 359/134 |
| 6,144,494 A | 11/2000 | Shirasaki et al. | 359/578 |
| 6,151,158 A | 11/2000 | Takeda et al. | 359/341 |
| 6,166,838 A | 12/2000 | Liu et al. | 359/128 |
| 6,175,432 B1 | 1/2001 | Wu et al. | 359/124 |
| 6,201,593 B1 | 3/2001 | Wong et al. | 349/180 |
| 6,208,442 B1 | 3/2001 | Liu et al. | 359/127 |
| 6,212,313 B1 | 4/2001 | Li | 385/24 |
| 6,333,799 B1 * | 12/2001 | Bala et al. | 359/117 |

OTHER PUBLICATIONS

Mahlein; "Fiber–Optic Communication in the Wavelength–Division Multiplex Mode"; Fiber and Integrated Optics, vol. 4, No. 4, Jun. 1982; pps. 339–372.

Melman et al.; "Tunable Birefringent Wavelength–Division Multiplexer/Demultiplexer"; Electronic Letters; vol. 21, 1985; pps. 634–635.

Senior et al.; "Devices for Wavelength Multiplexing and Demultiplexing"; IEEE Proceedings, vol. 136, Pt. J, No. 3, Jun. 1989, pps. 183–202.

Damask et al.; "Wavelength–Division Multiplexing using Channel–Dropping Filters"; Journal of Lightwave Technology; vol. 11, No. 3, Mar. 1993; pps. 424–428.

Derr et al.; "An Optical Infrastructure for Future Telecommunications Networks"; IEEE Communications; No. 11, Nov. 1995; pps. 84–88.

Hirabayashi et al.; "Tunable Wavelength–Selective Liquid Crystal Filters for 600–Channel FDM System"; IEEE Photonics Technology Letters; vol. 4, No. 6, Jun. 1992; pps. 597–599.

Saleh et al.; "Two–Stage Fabry–Perot Filters as Demultiplexers in Optical FDMA LAN's"; Journal of Lightwave Technology; vol. 7, No. 2, Feb. 1989; pps. 323–329.

Smith et al.; "Cascaded Acoustooptic/Fiber Fabry–Perot Filter with Finesse over 2000"; IEEE Photonics Technology Letters; vol. 5, No. 2, Feb. 1993; pps. 189–191.

Takahashi et al.; "Wavelength Multiplexer Based on $SiO_2$–$Ta_2O_5$ Arrayed–Waveguide Grating"; Journal of Lightwave Technology; vol. 12, No. 6, Jun. 1994; pps. 989–995.

Noguchi; "Optical Free–Space Multichannel Switches Composed of liquid–Crystal Light–Modulator Arrays and Birefringent Crystals"; *Journal of Lightwave Technology*, vol. 16, No. 8, Aug. 1998; pps. 1473–1481.

Inoue et al., "A Four–Channel Optical Waveguide Multi/Demultiplexer for 5–Ghz Spaced Optical FDM Transmission", *Journal of Lightwave Technology*, 6:2 (1998) 339–345.

Madsen et al., "A General Planar Waveguide Autoregressive Optical Filter", *Journal of Lightwave Technology*, 14:3 (1996) 437–447.

C.K. Madsen, "A Multiport Frequency Band Selector with Inherently Low Loss, Flat Passbands, and Low Crosstalk", *IEEE Photonics Technology Letters*, 10:12 (1998) 1766–1768.

Chung et al., "Analysis of a Tunable Multichannel Two–Mode–Interference Wavelength Division Multiplexer/Demultiplexer", *Journal of Lightwave Technology*, 7:5 (1989) 766–777.

Liu et al., "Digitally Programmable Wavelength–Switching Technology", *IEEE/LEDS Summer Topical Meetings* Aug. 1997, 9–10.

Madsen, "Efficient Architectures for Exactly Realizing Optical Filters with Optimum Bandpass Designs", *IEEE Photonics Technology Letters*, 10:8 (1998) 1136–1138.

Dingel et al., "Multifunction optical filter with a Michelson–Gires–Tournois interferometer for wavelength–division–multiplexed network system applications", *Optics Letters*, 23:14 (1998) 1099–1101.

Madsen et al., "Optical All–Pass Filters for Phase Response Design with Applications for Dispersion Compensation", *IEEE Photonics Technology Letters,* 10:7 (1998) 994–996.

Nosu et al., "Optical FDM Transmission Technique", *Journal of Lightwave Technology,* LT–5:9 (1987) 1301–1308.

Dingel et al., "Optical wave–front transformer using the multiple–reflection interference effect inside a resonator", *Optics Letters,* 22:9 (1997) 1449–1451.

Dingel et al., "Properties of a Novel Noncascaded Type, Easy–to–Design, Ripple–Free Optical Bandpass Filter", *Journal of Lightwave Technology,* 17:8 (1999) 1461–1469.

Peng et al., "Optical implementation of regular rectangular CC–banyon network by using polarizing beam splitters", *Optics Communications,* 117: (1995) 37–42.

Noguchi et al., "A Rearrangeable Multichannel Free–Space Optical Switch Based on Multistage Network Configuration", *Journal of Lightwave Technology,* 9:12 (1991) 1726–1732.

Kuroyanagi et al., "Optical Cross–Connect Architecture Using Free–Space Optical Switches Based on PI–LOSS Topology", *Fujitsu Laboratories Ltd.,* (1995) 2112–2117.

Brackett, "Dense Wavelength Division Multiplexing Networks: Principles and Applications", *IEEE Journal on Selected Areas in Communications,* 8:6 (1990) 948–964.

Ammann, "Synthesis of Electro–Optic Shutters having a Prescribed Transmission vs. Voltage Characteristic" *Journal of the Optical Society of America,* 56:8 (1966) 1081–1088.

Harris et al., "Optical Network Synthesis Using Birefringent Crystals v. Synthesis of Lossless Networks Containing Equal–Length Crystals and Compensators", *Journal of the Optical Society of America,* 54:10 (1964), 1267–1279.

Ammann et al., "Optical Network Synthesis Using Birefringent Crystals v. Synthesis of Lossless Networks Containing Equal–Length Crystals and Compensators", *Journal of the Optical Society of America,* 56:12 (1966), 1746–1754.

Kuznetsov, "Cascaded Coupler Mach–Zehnder Channel Dropping Filters for Wavelength–Division–Multiplexed Optical Systems", *Journal of Lightwave Technology,* 12:2 (1994) 226–230.

Takato et al., "Silica–Based Integrated Optic Mach–Zehnder Multi/Demultiplexer Family with channel Spacing of 0.01–250 nm", *IEEE Journal on Selected Areas in Communications,* 8:6 (1990) 1120–1127.

Verbeek et al., "Integrated Four–Channel Mach–Zehnder Multi/Demultiplexer Fabricated with Phosphorous Dopes $SiO_2$ Waveguides on Si", *Journal of Lightwave Technology,* (1988) 1011–1015.

Glance, B., "Tunable Add/Drop Optical Filter Providing Arbitrary Channel Arrangements", *IEEE Photonics Technology Letters,* 7:11 (1995) 1303–1305.

Suzuki et al., "Integrated Multichannel Optical Wavelength Selective Switches Incorporating an Arrayed–Waveguide Grating Multiplexer and Thermo–optic Switches", *Journal of Lightwave Technology,* 16:4 (1998) 650–652.

Mizouochi et al., "All–fiber add/drop multiplexing of 6×10 Gbit/s using a photo–induced Bragg grating filter for WDM networks", *OFC 96 Technical Digest,* 116–117.

\* cited by examiner

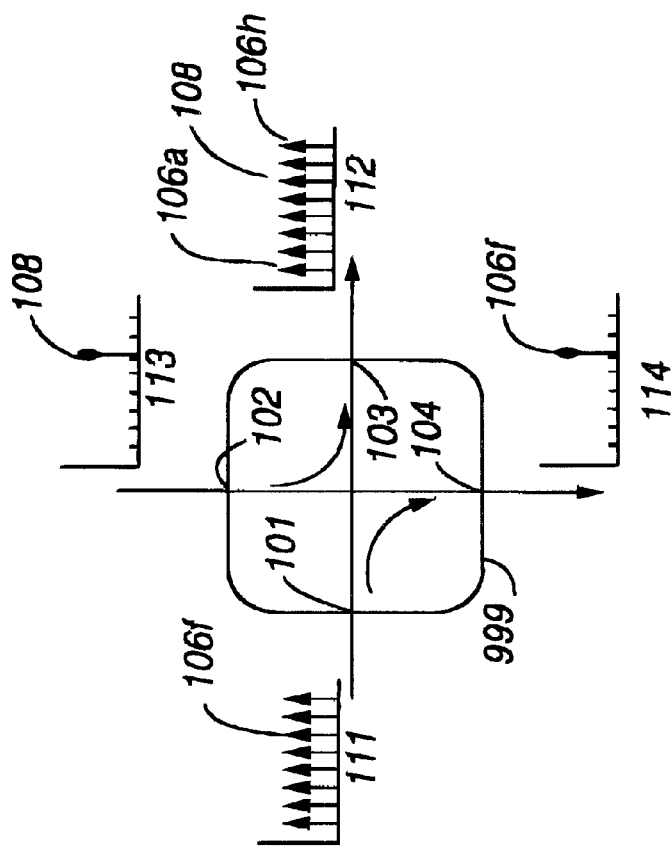
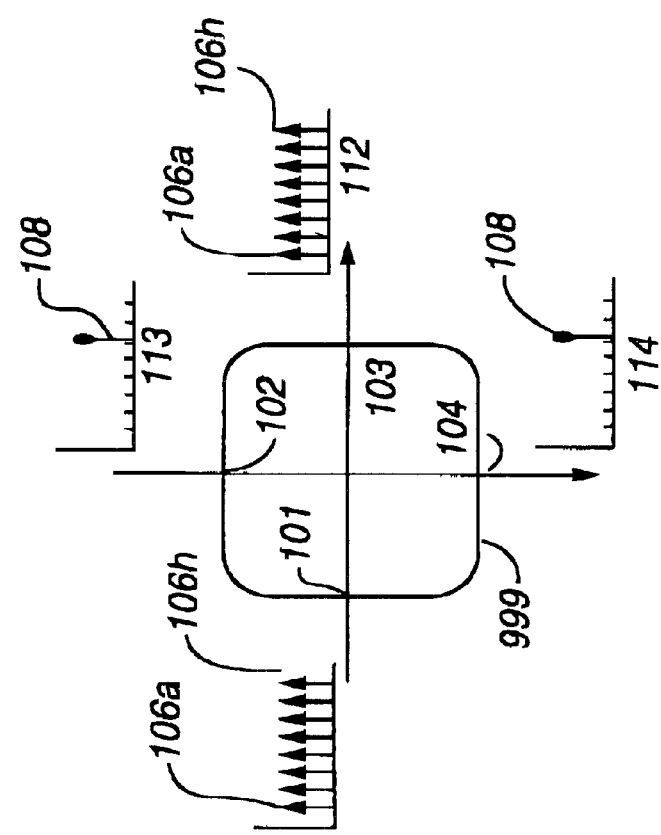
Fig. 1a
Fig. 1b

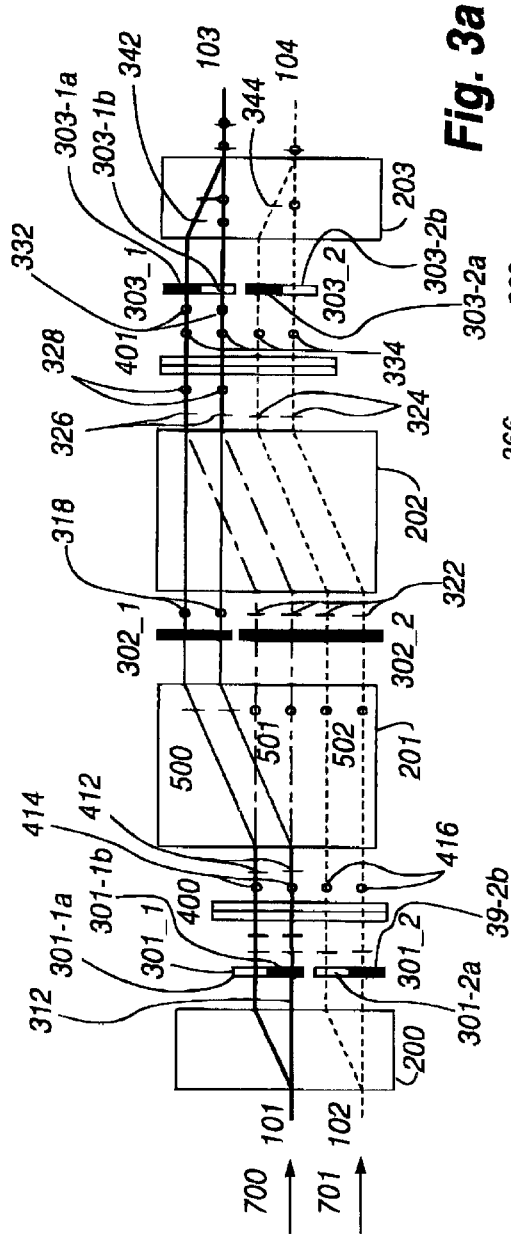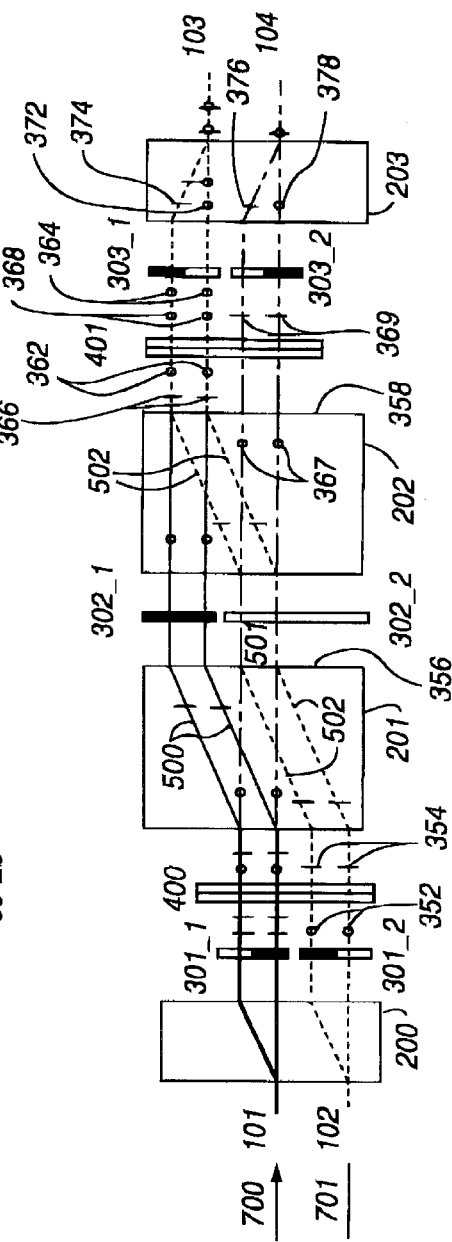
Fig. 3a
Fig. 3b

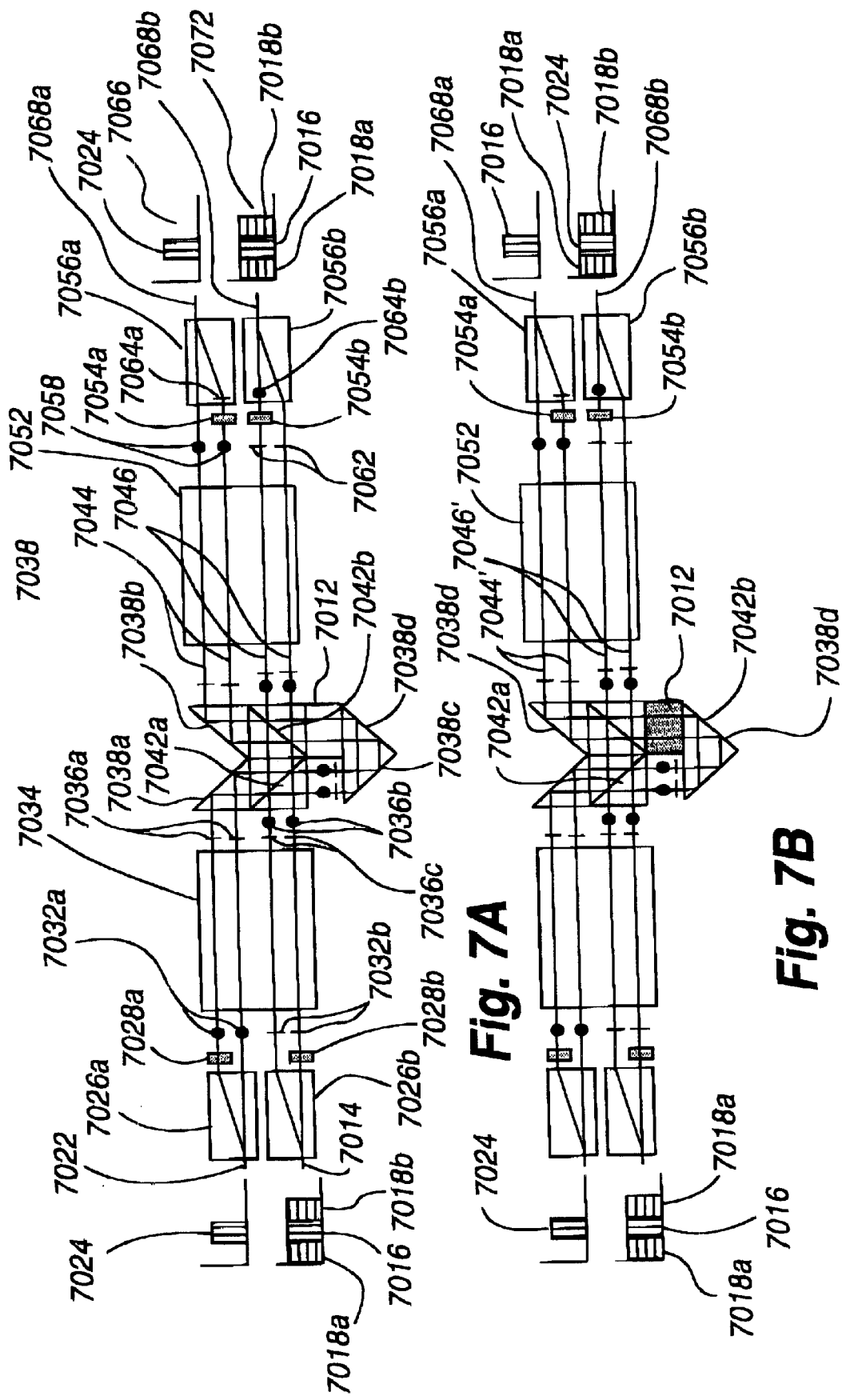

OPTICAL ADD/DROP WAVELENGTH SWITCH

CROSS REFERENCE TO RELATED APPLICATION

The present application is a continuation application of pending prior application Ser. No. 09/036,202, now U.S. Pat. No. 6,166,838, filed Mar. 6, 1998, incorporated herein by reference, which claims priority from U.S. Provisional patent application 60/042,373, filed Mar. 24, 1997 titled "Optical Add/Drop Wavelength Switch" incorporated herein by reference.

GOVERNMENT INTERESTS

The invention was made with Government support under Contract DARPA II: DAAH01-97-C-R308 awarded by U.S. Army Missile Command, AMSMI-AC-CRAY, Redstone Arsenal, AL 35898. The Government has certain rights in the invention.

The present invention relates, in general, to optical communication systems, and, more particularly, to an add/drop wavelength switch for wavelength division multiplex (WDM) optical communications.

BACKGROUND INFORMATION

Optical wavelength division multiplexing has gradually become the standard backbone network for fiber optic communication systems. WDM systems employ signals consisting of a number of different optical wavelengths, known as carrier signals or channels, to transmit information on optical fibers. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome, such as, multiplexing, demultiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. Demultiplexing is the opposite process in which a single WDM signal is decomposed into individual channels. The individual channels are spatially separated and coupled to specific output ports. Routing differs from demultiplexing in that a router spatially separates the input optical channels into output ports and permutes these channels according to control signals to a desired coupling between an input channel and an output port.

Currently, filters based on fiber Bragg gratings (FBG) are among the most popular add/drop wavelength filters used in WDM networks for the add/drop operation. Another approach in the add/drop operation is the use of an array-waveguide-grating filter. In both cases, the add/drop operation is always on, which, it is believed, is not a very effective way to utilize the optical channel. Although another 2×2 optical switch can be integrated with the FBG such that an add/drop operation can be controlled by a switching gate, this is fundamentally cumbersome and ineffective. Furthermore, optical switches available in the market are mostly mechanical optical switches that are not suitable in network wavelength routing because of their short lifetime (i.e., a moving motor wears out in time) and high power consumption. Although other types of optical switches are available, such as thermal optical switches, crosstalk in such switches is generally too high to permit large scale systems to be provided.

SUMMARY OF THE INVENTION

The present invention combines the characteristics of add/drop operation of a filter and the switching capability of an optical switch. The add/drop wavelength switch has at least two input ports for the incoming WDM signal and the add signal, and at least two output ports for the WDM pass-through signal and the drop signal. The wavelength switch is operated in two modes, referred to as the bridge state and add/drop state, respectively. In the bridge state, the incoming WDM signal continuously flows through the optical node without being disturbed. When controlled to do so by either the local optical node or the WDM network, the wavelength switch changes to the add/drop state in which a pre-defined optical channel is dropped from the WDM signal and the add signal is substituted into the WDM signal. The add signal can be a single channel or multiple channels. A unique feature of this add/drop wavelength switch is that the pass-through channels are not disturbed by the transition during switching between states. This assures the uninterrupted flow of WDM signals through the network. Based on this feature, an optical token ring can be realized in which multiple add/drop wavelength switches are cascaded. An array of these add/drop switches can be used to implement a wavelength crossbar that enables optical channels to be arbitrarily exchanged between multiple WDM networks.

An optical add/drop wavelength switch is controllably changed from a bridge state, in which output is identical to input, e.g. a Wavelength Division Multiplexed (WDM) input, and an add/drop state, in which a signal input to an add port is substituted for a particular wavelength subrange of the WDM input, other wavelengths of the WDM input being unchanged. In one embodiment, the wavelength subrange of the WDM signal is given a polarization different from other wavelengths of the WDM, such as by using a stacked waveplate or other optical filter or polarization discriminator. The differently-polarized wavelengths can the be spatially separated, e.g. by a birefringent element or a polarization beam splitter, preferably in a bit-controlled fashion, such as by using a liquid crystal or other polarization controller. Polarization controllers and discriminators can be used similarly to selectably align or combine the add signal with the portion of the WDM signal outside the subrange. The add/drop wavelength switch can be used, e.g. in an optical token ring network and/or to make-up an optical crossbar for exchanging any arbitrarily designatable channels, e.g. among a plurality of multi-channel optical fibers.

BRIEF DESCRIPTION OF THE DRAWINGS

The present invention can be more readily understood in conjunction with the accompanying drawings, in which:

FIGS. 1a and 1b are block diagrams illustrating the functionality of the add/drop wavelength switch in accordance with an embodiment of the present invention in the bridge state and the add/drop state, respectively;

FIG. 2a shows asymmetric spectra. FIG. 2b shows the spectra for an add/drop wavelength switch with evenly spaced inter-digital characteristics;

FIGS. 3a and 3b illustrate in schematic form a 2-D add/drop wavelength switch according to an embodiment of the present invention in the bridge state (FIG. 3a) and add/drop state (FIG. 3b);

FIGS. 7a and 7b illustrates in schematic form, an add/drop wavelength switch according to an embodiment of the present invention.

DETAILED DESCRIPTION OF THE PREFERRED EMBODIMENT

Figure 2A:
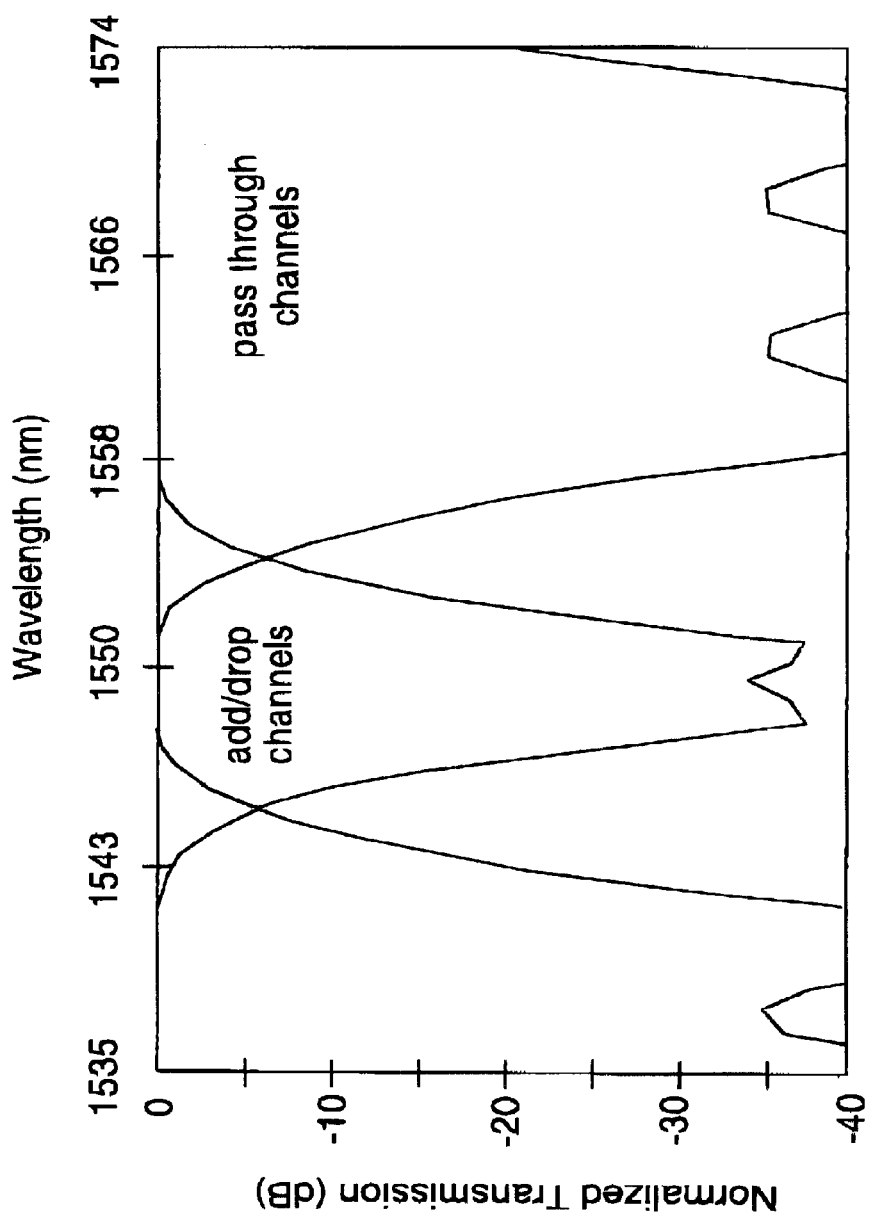
FIGS. 2A and 2B show two examples of the spectra of the add/drop wavelength switch according to an embodiment of the present invention.

FIGS. 1a and 1b illustrate in block diagram form the general functionality of the present invention. As used herein, the term "channel" refers to a particular range of frequencies or wavelengths that define a unique information signal. Each channel is ideally evenly spaced from adjacent channels, although this is not necessary. Uneven spacing may result in some complexity in design, but, as will be seen, the present invention can be adapted to such a channel system in a manner that will be clear to those of skill in the art after understanding the present disclosure. This flexibility is important in that the channel placement is driven largely by the technical capabilities of transmitters (i.e., laser diodes) and detectors, so flexibility is of significant importance.

In the illustration, laterally spaced symbols such as arrows 106a–106h and distinguished symbols 108 each indicate a channel with the input signal 111 made up of a number of channels. The WDM signal 111 is fed as an input through port 101 using conventional optical signal coupling techniques to the add/drop wavelength switch 999. In the bridge state shown in FIG. 1a, the WDM signal 111 passes through the wavelength switch 999 uninterrupted and exits at port 103 to be redirected back to the WDM network. The add port 102 and drop port 104 are connected to form a "bridger" in which no add/drop operation occurs. The add signal 113 that is input through the add port 102 passes through the wavelength switch 999 and exits at the drop port 104 as the drop signal 114.

In contrast, when the add/drop wavelength switch 999 is switched to the add/drop state, a pre-defined optical channel 106f is extracted from the WDM signal 111 and exits as the drop signal 114 at the drop port 104. The add signal 113, on the other hand, is combined with the WDM signal exiting at port 103 to the WDM network as shown in FIG. 1b.

Figure 2B:
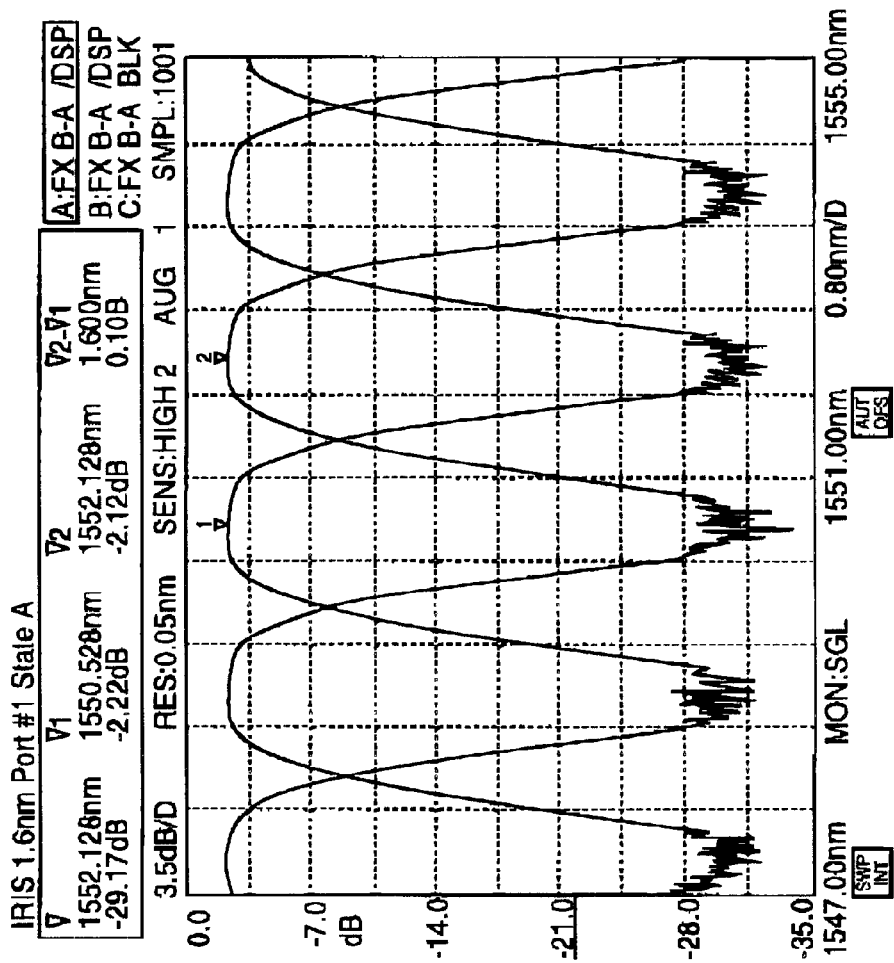

The output spectra of the add/drop wavelength switch are designed based on the function required by the WDM network. In FIGS. 2a and 2b, two experimental examples are given to show evenly spaced add/drop channels (FIG. 2b) and asymmetrical channels (FIG. 2a) that can be realized by using the composite-waveplate (CWP) technique disclosed in the Applicants' U.S. patent applications Ser. Nos. 08/739, 424 and 08/780,291 (now U.S. Pat. No. 5,694,233), incorporated herein by reference.

FIGS. 3a and 3b illustrate the add/drop wavelength switch 999 in schematic form in two control states. In accordance with a preferred embodiment, the add/drop switch 999 is under binary control from a control bit and has two states (i.e., "bridge" or "add/drop"). In FIGS. 3a and 3b, bold solid lines indicate the optical paths for the fill spectrum of channels in the WDM input signal 700. Solid thin lines indicate the optical paths of signals comprising a primary subset of channels from the WDM signals that are to pass through the add/drop switch 999 undisturbed. Thin-intermittent dashed lines indicate the optical paths for the drop channels that comprise a secondary subset of channels. Thin dotted lines indicate the optical path for the add signal. Finally, thick dotted lines are the optical paths for the primary subset of channels from the WDM network combined with the add signal. It is important to understand that each of these subsets may comprise more than one channel and may itself be a set of WDM signals. Each of the lines representing optical paths are further labeled with either a short perpendicular line indicating horizontal polarization, or a large dot indicating vertical polarization, or both a perpendicular line and a large dot indicating mixed horizontal and vertical polarizations in the optical signal at that point.

In FIG. 3a, the WDM signals 700 and the add signal 701 enter a first birefringent element 200 that spatially separates the horizontal and vertically polarized components of these signals 700, 701. The first birefringent element 200 is made of a material that allows the vertically polarized portion of the optical signal to pass through without changing course because they are ordinary waves in the birefringent element 200. In contrast, horizontally polarized waves are redirected at an angle because of the birefringent walk-off effect. The angle of redirection is a well-known function of the particular materials chosen. Examples of materials suitable for construction of the birefringent elements used in the preferred embodiments include calcite, rutile, lithium niobate, YVO4 based crystals, and the like. A polarization beam splitter can also be used to perform a similar function for polarization separation.

The vertically polarized components 312 from the input WDM signal 700 are coupled into a fixed polarization rotator 301_1 such that the state of polarization (SOP) becomes horizontal. The add signal 701 is coupled to a switchable (e.g. in response to a control bit) polarization rotator 301_2 under control of a control bit. Switchable polarization rotator 301_2 consists of two sub-element rotators 301-2a, 301-2b that form a complementary state, i.e. when one turns on the other turns off. Rotator 301_2 serves to selectively rotate the polarization of the add signal by a predefined amount. In the preferred embodiment, rotator 301_2 rotates the polarization of signals by either 0° (i.e., no rotation) or 90°. In FIGS. 3a and 3b, gray-shaded areas indicate polarization rotation and white (transparent) areas indicate no polarization rotation. The switchable polarization rotator 301_2 can be made of one or more types of known elements including parallel aligned nematic liquid crystal rotators, twisted nematic liquid crystal rotators, ferroelectric liquid crystal rotators, pi-cell liquid crystal rotators, magneto-optic based Faraday rotators, acousto-optic and electro-optic polarization rotators. Commercially available rotators using liquid crystal based technology are preferred, although other rotator technologies may be applied to meet the needs of a particular application. The switching speeds of these elements range from a few milliseconds to nanoseconds, and therefore can be applied to a wide variety of systems to meet the needs of a particular application. These and similar basic elements are considered equivalents and may be substituted and interchanged without departing from the spirit of the present invention.

FIG. 3a illustrates the bridge state in which the signals exiting the polarization rotators 301_1 and 301_2 have horizontal polarization as indicated by the short vertical lines to the right of the polarization rotators 301-1, 301-2. A first stacked waveplates element 400 is made of a stacked plurality of birefringent, composite waveplates at selected orientations that generate two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary (second) part of the input spectrum, where V and H are vertical and horizontal polarizations, respectively. Further details of the design and the filtering mechanism of the stacked waveplates element are disclosed in the Applicants' U.S. patent application Ser. Nos. 08/739,424 and 08/780,291 (now U.S. Pat. No. 5,694, 233), incorporated herein by reference.

In the case of this add/drop wavelength switch, the first eigen state carries the primary sub-spectrum (i.e., the undisturbed WDM signals) with the same polarization as the input, and the second eigen state carries a complementary sub-spectrum (i.e., the add/drop channels) at the orthogonal polarization.

The input WDM signal 700 is decomposed into two components orthogonal polarizations when passing through the first stacked waveplates element 400. The primary spectrum 500 is coded in the horizontal polarization 412 and the drop spectrum 501 is coded in the vertical polarization 414. The add signal 701, has a horizontal polarization before entering the stacked waveplates element 400. It is rotated by 90° as it passes through the first stacked waveplates element 400, because it has the same spectrum as the drop channel. At the plane after the first stacked waveplates element 400 as shown in FIG. 3a, the add/drop channels are vertically polarized 416, while the primary spectrum is horizontally polarized 412.

Optical signals 500, 501 and 502 represent the primary, drop and add signals that are coupled to the second birefringent element 201. The second birefringent element 201 has a similar construction to the first birefringent element 200 and serves to spatially separate the horizontally and vertically polarized components of the optical signals 500, 501 and 502. The two orthogonal polarizations that carry the primary spectrum 500 in horizontal polarization and the add/drop spectrum 502, 501 in vertical polarization are separated by the second birefringent element 201 because of the birefringent walk-off effect.

A second set of polarization rotators 302_1 and 302_2 follow the second birefringent element 201. The primary signal 500 passes through a fixed-type (non-switching) rotator 302_1 that rotates the polarization by 90°. The add/drop signals 502, 501 pass through a switchable polarization rotator 302_2, that, in the bridge state (FIG. 3a) is also set (e.g. in response to the control bit) to rotate the polarization by 90°. At the exit plane of the polarization rotators 302_1 and 302_2, the primary spectrum has vertical polarization 318 and the add/drop spectra have horizontal polarization 322, as indicated in FIG. 3a.

Following the second set of polarization rotators 302_1 and 302_2, the preceding components are repeated, but arranged in opposite order. As shown for the bridge state in FIG. 3a, a third birefringent element 202 recombines the primary spectrum 500 and the drop signal 501 because of the walk-off effect. Thus, in the bridge state, no add/drop operation occurs. The add signal 502 propagates upward in the third birefringent element 202 and keeps its horizontal polarization 324.

The second stacked waveplates element 401 has the same structure and composition as to the first stacked waveplates element 400. With the horizontally polarized (324, 326) beams 501, 502 input to the second stacked waveplates element 401, the add/drop spectrum is further purified and rotates its polarization by 90°, 334. On the other hand, the vertically polarized (328) beam 500 (carrying the primary WDM signals) input to the second stacked waveplates element 401 maintains its polarization 332 but is also purified when it exits the second stacked waveplates element 401. The 9° polarization rotation 334 of the horizontally polarized beams 501, 502 is due to the fact that the add/drop spectrum is the complementary state of the second stacked waveplates element 401. At the output of second stacked waveplates element 401, all four beams have vertical polarization 332, 334. The upper two beams carry the full WDM spectrum and the lower two beams carry the add signal's spectrum.

To recombine the two sets of beams, a third set of polarization rotators 303_1 and 303_2 and a fourth birefringent element 203 are used. Again, the third set of polarization rotators consists of a fixed-type polarization rotator 303_1 and a switchable (e.g. in response to the control bit) polarization rotator 303_2. At least the second (and, if desired both) of the polarization rotators 303_1 and 303_2 have two sub-elements 303-1a, 303-1b, 303-2a, 303-2b that intercept the two sets of beams. The complete WDM signals carried by the upper two beams (indicated by the heavy solid lines after the third birefringent element 202 in FIG. 3a) pass through the fixed polarization rotator 303_1 such that one of the upper beams has its polarization is rotated by 90° 342. The two orthogonal polarizations are then recombined by the fourth birefringent element 203 that exits to port 103.

The two lower beams carrying the add signal pass through the switchable polarization rotator 303_2 so that the polarization of one of the lower beams is rotated 344 by 90°. They are then recombined by the fourth birefringent element 203. In this design, the sub-elements 303-1a, 303-1b, 303-2a, 303-2b of the third set of polarization rotators 303_1 and 303_2 are set at complementary states to the corresponding sub-elements 301-1a, 301-1b, 301-2a, 301-2b in the first set of polarization rotators 301_1 and 301_2. This complementary design assures high contrast operation for the polarization rotators and further assures high isolation for spectral filtering. This completes the bridge state of operation for the add/drop wavelength switch 999.

In the add/drop state, the optical paths are shown in FIG. 3b. The three switchable polarization rotators 301_2, 302_2 and 303_2 have switched (e.g. in response to a change in the control bit) to their complimentary states, i.e. from on to off or off to on, depending on their original states. In this state of operation, the light paths for the primary spectrum 500 remain unchanged (compared to the bridge state). This design assures that the WDM signals that are not affected by the add/drop operation flow through the optical node without being interrupted. This can be seen from the optical paths for the primary spectrum 500 through the fixed polarization rotators 301_1, 302_1 and 303_1 shown in FIGS. 3a and 3b. The primary spectrum 500 passes undisturbed through the entire add/drop wavelength switch 999 along an optical path that remains unchanged between the bridge state (FIG. 3a) and the add/drop state (FIG. 3b).

In contrast, the paths of the add signal and the drop signal are interchanged between the add/drop state and the bridge state, i.e., the drop signal 501 now exits at port 104 and the add signal 502 is combined with WDM primary signal 500 that exits through port 103. In FIG. 3*b*, the add signal 701 is again decomposed into two orthogonal polarizations. Because the first polarization rotator 301_2 is now set to have the output polarizations all vertical 352, they pass through the first stacked waveplates element 400 which rotates the polarization by 90° so that both components of the add signal 701 become horizontally polarized 354. These horizontally polarized beams propagate upward in the second birefringent element 201 due to its extraordinary wave characteristic. The add signal 502 meets the drop signal 501 at the exit plane 356 of the second birefringent element 201. These two signals containing the add/drop spectra then pass through the second polarization rotator 302_2, which is set for no polarization rotation. The add signal 502 continues to propagate upward through the third birefringent element 202 and meets the primary WDM signal 500 at the exit plane 358 of the third birefringent element 202. The drop signal 501, however, propagates straight through the third birefringent element 202 because it is an ordinary wave in this birefringent element 202. It is clear up to this point that the add signal and the drop signal have exchanged their paths in comparison to the bridge state shown in FIG. 3*a*.

These four beams pass through the second stacked waveplates element 401. The primary signal 500 keeps its polarization 362, 364 and the add/drop signals 502, 501 rotate their polarizations by 90° 366, 367, 368, 369. They pass through the fourth set of polarization rotators 303_1 and 303_2 such that orthogonal polarizations result 372, 374, 376, 378. These two sets of beams are recombined by the fourth birefringent element 203 and exit to ports 103 and 104, respectively. This completes the add/drop operation of the add/drop wavelength switch 999.

Figure 4A:
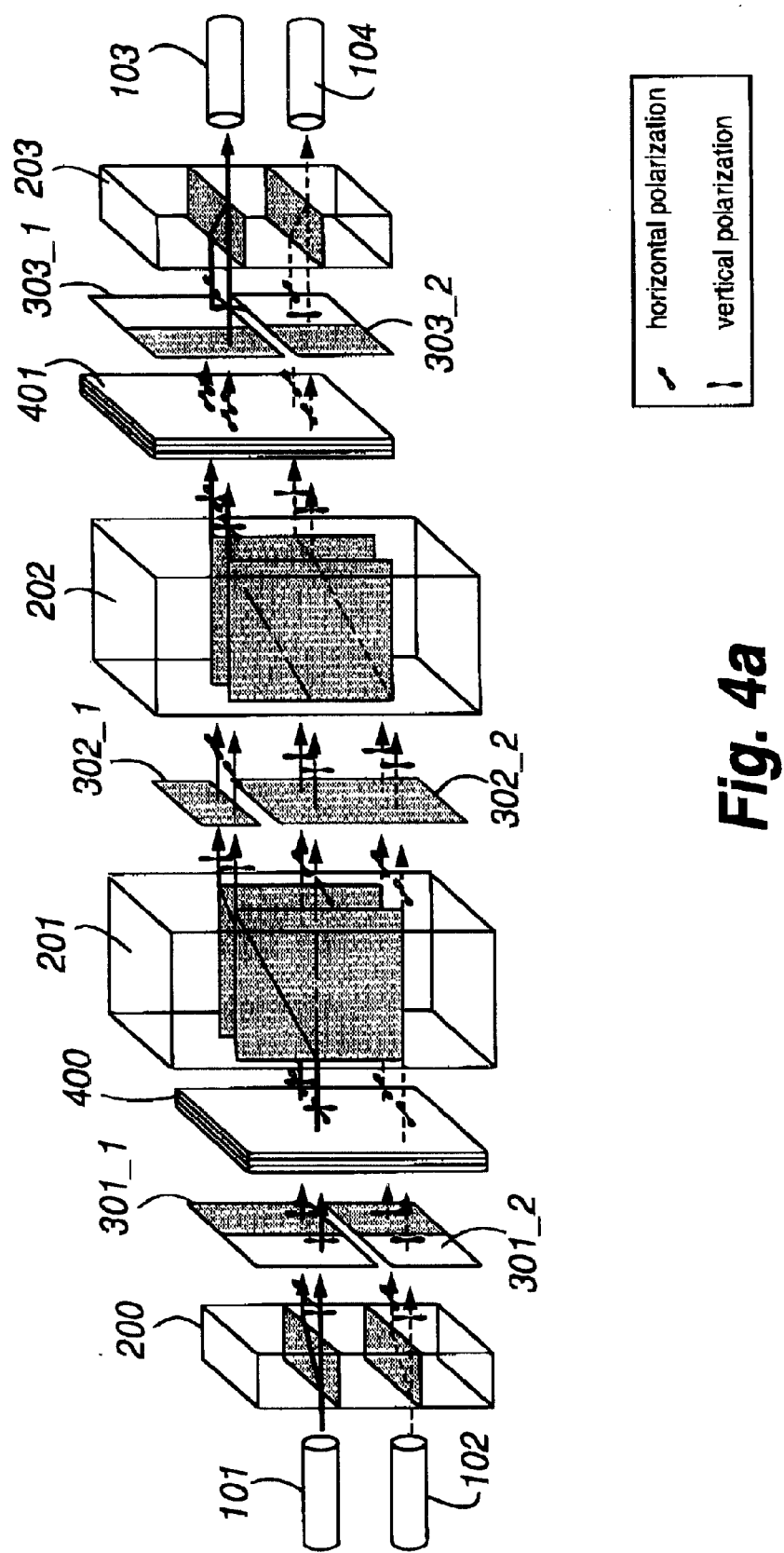
FIGS. 4a and 4b illustrate a schematic form of a 3-D add/drop wavelength switch according to an embodiment of the present invention in the bridge state (FIG. 4a) and add/drop state (FIG. 4b)

In the two-dimensional wavelength switch depicted in FIGS. 3*a* and 3*b*, all the optical paths are laid within the same plane. However, the design concept of the present invention is not limited by this structure. An example showing a three-dimensional design is illustrated in FIGS. 4*a* for the bridge state and 4*b* for the add/drop state operation. Two changes have been made with this structure as compared to the 2-D design shown in FIGS. 3*a* and 3*b*. In this embodiment, the first and fourth birefringent elements 200 and 203 are oriented orthogonally to the second and third birefringent elements 201 and 202. The second change is the arrangement of the sub-elements (or pixels) of the polarization rotators, 301, 302 and 303.

FIG. 7A and 7B depict another embodiment providing an optical add/drop wavelength switch. FIG. 7A depicts the configuration in the bridge state and FIG. 7B depicts the configuration in the add/drop state. The add/drop state differs, in its configuration, from the bridge state in that, in the bridge state, a switchable liquid crystal polarization controller 7012 is set in a non-rotating state while in the add/drop state, the polarization controller 7012 is set (e.g., in response to a change in a control bit) to cause both horizontal and vertical polarization to be rotated by 90 degrees. The effect will be described below. As can be seen by comparing FIGS. 7A and 7B, it is possible using the depicted switch to achieve selectable add/drop functions by controlling only a single element, i.e. all other elements, including the polarization rotators, can be provided as fixed (non-switching) components.

Figure 4B:
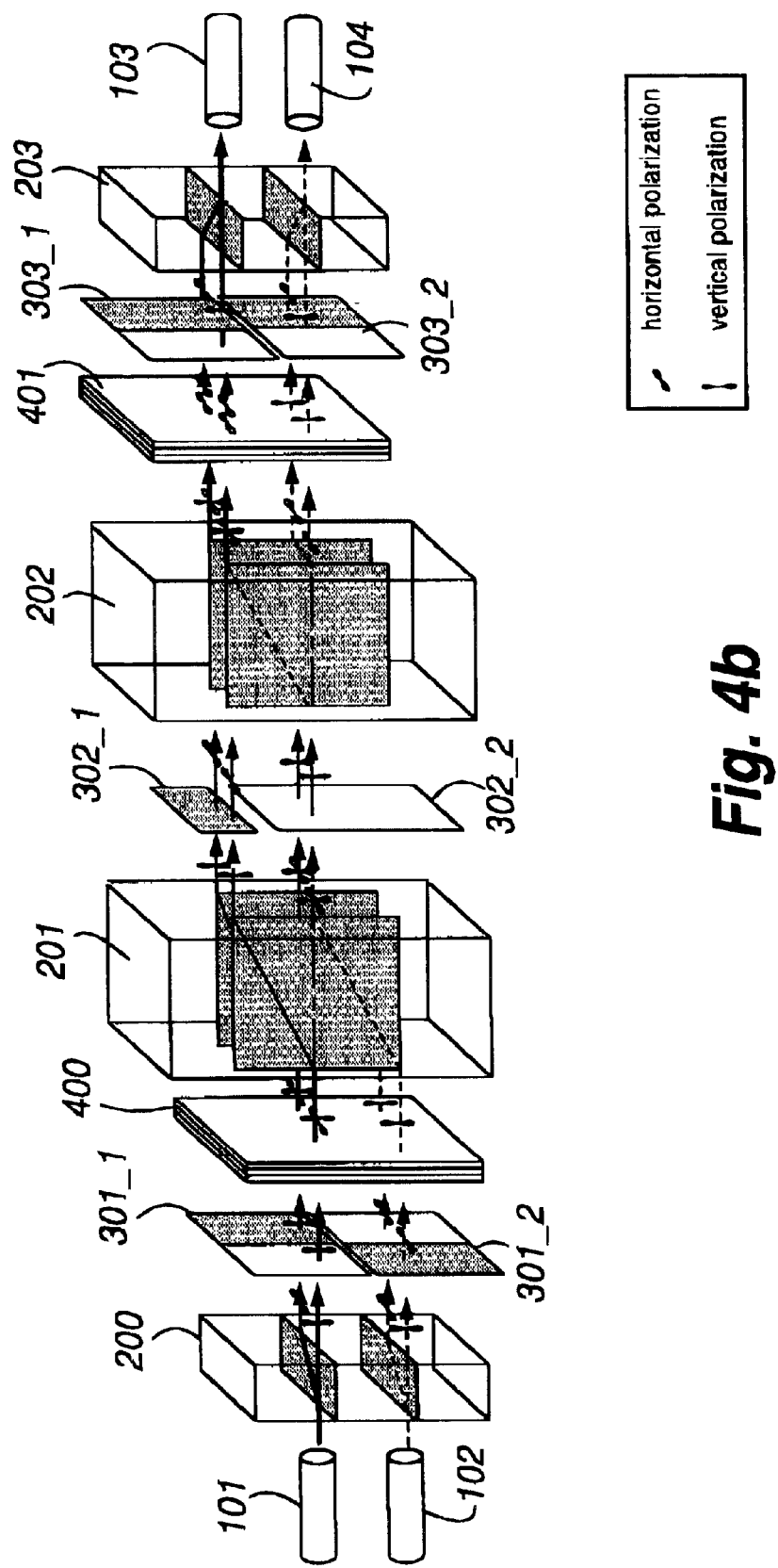

In FIG. 7A, an input port 7014 receives a WDM input signal which, in the depicted embodiment, includes a first wavelength (or range of wavelengths) or channel 7016, as well as other channels 7018*a*, 7018*b*. The add port 7022 receives an add signal containing a frequency or frequencies 7024 corresponding to those of the WDM signal with which the add signal 7024 is to be exchanged in the add/drop state. In a manner similar to that described above in connection with FIGS. 3 and 4, birefringent elements or other polarization separators 7026*a*, 7026*b* spatially separate the horizontal and vertically polarized components of the signals 7022, 7014. A first polarization rotation 7028*a* (such as a polymer or other polarization rotator) rotates the horizontally polarized portion of the add signal to a vertical rotation so that both component beams are in a vertical orientation for polarization 7032*a*. A polarization rotator 7028*b* is positioned to provide a 90 degree polarization rotation to the vertically polarized component of the WDM signal so that both beams of the WDM signal are horizontally polarized 7032*b*.

In a manner similar to that discussed above in connection with FIGS. 3 and 4, a filter 7034 is configured to generate two eigen states as described above. In the embodiment of FIG. 7A, the polarization of the add signal is rotated from vertical 7032*a* to horizontal 7036*a*, while the WDM signal has the corresponding wavelength 7016 rotated to vertical polarization 7036*b* while other wavelengths 7018*a*, 7018*b* remain in a horizontal polarization 7036*c*.

A combination polarization beam separator and prism (PBS/P) 7038 includes right angle prisms 7038*a*, 7038*b*, 7038*c*, 7038*d* and PBSs 7042*a*, 7042*b*. The polarization beam separators are configured to reflect (e.g. at 90 degrees) components having a first polarization (in the illustrated embodiment, reflecting vertically polarized components) while transmitting horizontally oriented components. Examples of polarization beam separators that can be used In accordance with the present invention include those available from Nitto Optical Co. Ltd. of Japan and those available from Lambda Research. Thus, in the configuration of FIG. 7*a*, the horizontally polarized add signal is reflected by right angle prism 7038*a*, is transmitted through PBS 7042*a* to right angle prism 7038*c*, thence to right angle prism 7038*d*, through the second PBS 7042*b* and reflected by right angle prism 7038*b*, e.g. back into its original path 7044. The horizontally polarized portion of the WDM signal 7036*c* is transmitted straight through the first and second PBSs 7042*a*, 7042*b* along its original path 7046. The vertically polarized component of the WDM signals 7036*b* is reflected downward by the first PBS 7042*a* and thence reflected by the second and third prisms 7038*c*, 7038*d* to the second PBS 7042*b* where it is reflected back into its original path 7046. Accordingly, when the switch is in its bridge state as depicted in FIG. 7*a*, the signal output by the PBS/P 7044, 7946 is identical to that which is input to the PBS/P 7038. Accordingly, the bridge function can now be achieved by using a second filter 7052, third and fourth polarization rotators 7054*a*, brand third and fourth polarization separator/combiners. 7056*a, b*. Second filter 7052 provides 90 degree rotation to components within a first wavelength range 7024, 7016 while leaving other components 7018*a*, 7018*b* unrotated so the result is a vertically oriented polarized add signal 7058 and horizontally polarized WDM signal 7062. Polarization rotators 7054*a*, 7054*b* are positioned to rotate one of the beams of the add signal to a horizontal polarization 7064*a* and rotate one of the beams of the WDM signal to a vertical polarization 7064*b* so that the polarization separator/combiner 7056*a*, 7056*b* will combine the signals to provide a single drop signal 7066 at the first output (drop) portion 7068*a* (which will be substantially identical to the input/add signal 7024) and a single bridge output signal 7072 at the second output port 7068b (which is substantially identical to the input WDM signal 7016, 7018a, 7018b).

As noted above, the configuration of FIG. 7B is substantially identical to that of FIG. 7A except for the state of polarization controller 7012. Accordingly, the horizontally polarized portion of the WDM signal will be transmitted straight through the first and second PBS components 7042a, 7042b. Similarly, the signals reflected from the third prism 7038d will be identical to that described above in connection with FIG. 7A, i.e., the vertically polarized portion of the WDM signal and the add signal components (which are horizontally polarized) will be reflected upward by the third prism 7038d to the polarization controller 7012. However, in FIG. 7B, the polarization controller 7012 is in an active state such that it will rotate the vertically polarized portion of the WDM signal to a horizontal rotation and will also rotate the horizontally polarized add signal to a vertical polarization. Accordingly, the add signal which, in the bridge configuration passed through the second PBS 7042b, will, in the add/drop configuration of FIG. 7B, be reflected by the second PBS 7042b, in line with the horizontally polarized portion of the WDM 7046'. The selected wavelength range from the WDM signal which in the bridge configuration of FIG. 7A was reflected by the second PBS 7042b, will, in the add/drop configuration of FIG. 7B be transmitted straight through the second PBS to the fourth prism 7038d where it will be reflected into the path 7044' which, in the bridge configuration (FIG. 7a) was taken by the add signal 7024. Thus, the selected range 7016 of the WDM signal and the add signal 7024 have been caused to exchange paths, compared to their paths in the (post PBS/P) bridge configuration. Accordingly, although the configuration and operation of the second filter 7052 polarization rotator 7054a, 7054b and separator/combiners 7056a, 7056b are identical to the configuration and operation in the bridge state (FIG. 7A), the signal provided on the output port WDM 7068b includes the add signal 7024 while the output of the drop port 7068a is the component 7016 of the input WDM signal which formerly occupied the channel now occupied by the add signal 7024.

Figure 5:
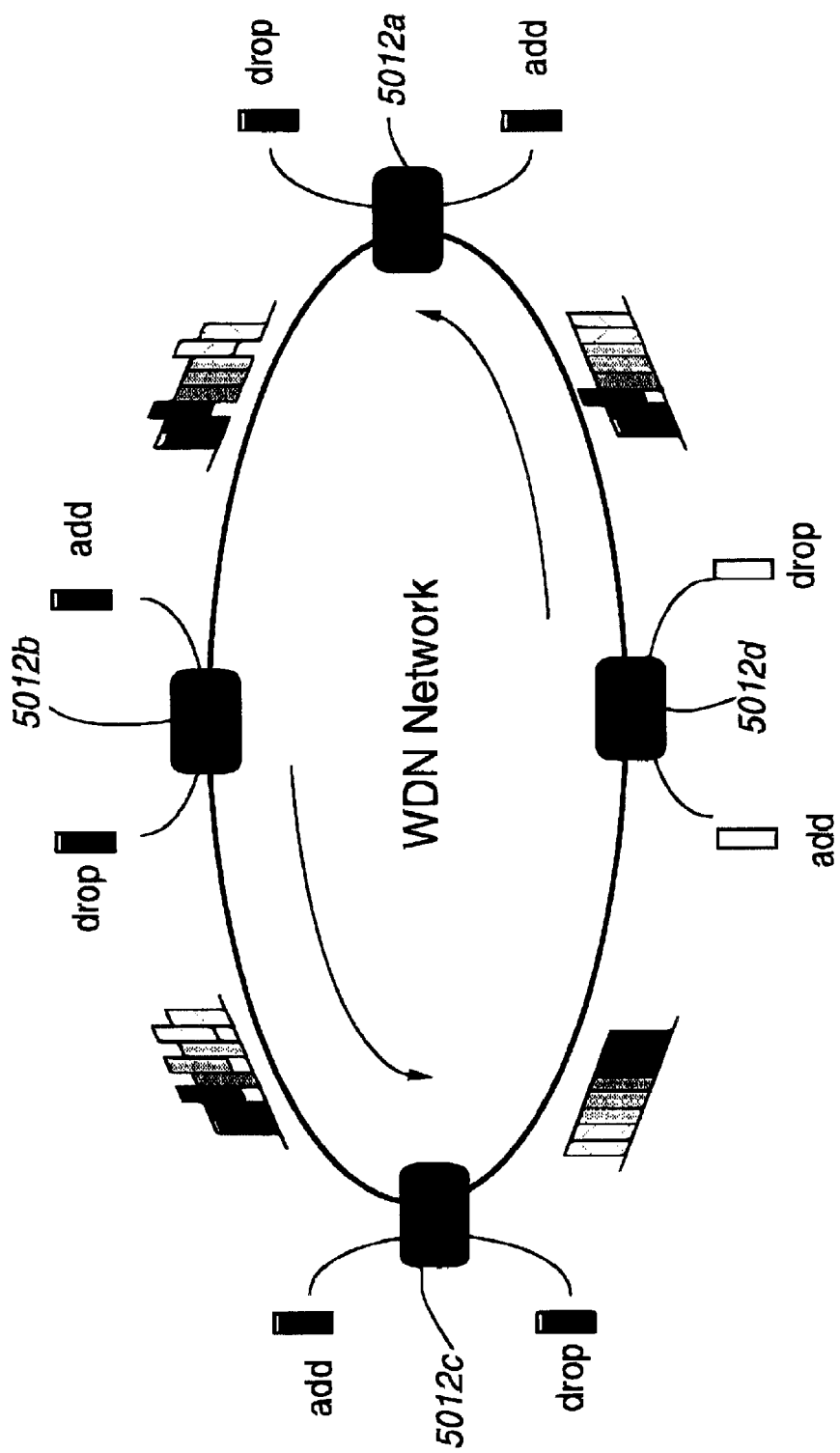
FIG. 5 shows an optical token ring based on cascaded add/drop wavelength switches according to an embodiment of the present invention.

Several system applications can benefit from this invention. For example, FIG. 5, illustrates an optical token ring for circulating optical channels in a WDM network. In FIG. 5, laterally spaced bars indicate different optical channels. Each add/drop node 5012a–d can extract or (drop) a predefined optical channel and substitute another (add) optical channel that is spectrally complementary to the pass-through channels. At least two features distinguish this add/drop wavelength switch from the prior art. First, a single wavelength switch can extract multiple contiguous channels from the WDM network without cascading stages of filters, as are required with fiber Bragg grating based filters. Second, the pass-through WDM signals will not be affected by the add/drop wavelength switch during the switching process. To our knowledge, no such a device is available in the industry. This "no interruption" design assures continuous information flow.

Figure 6:
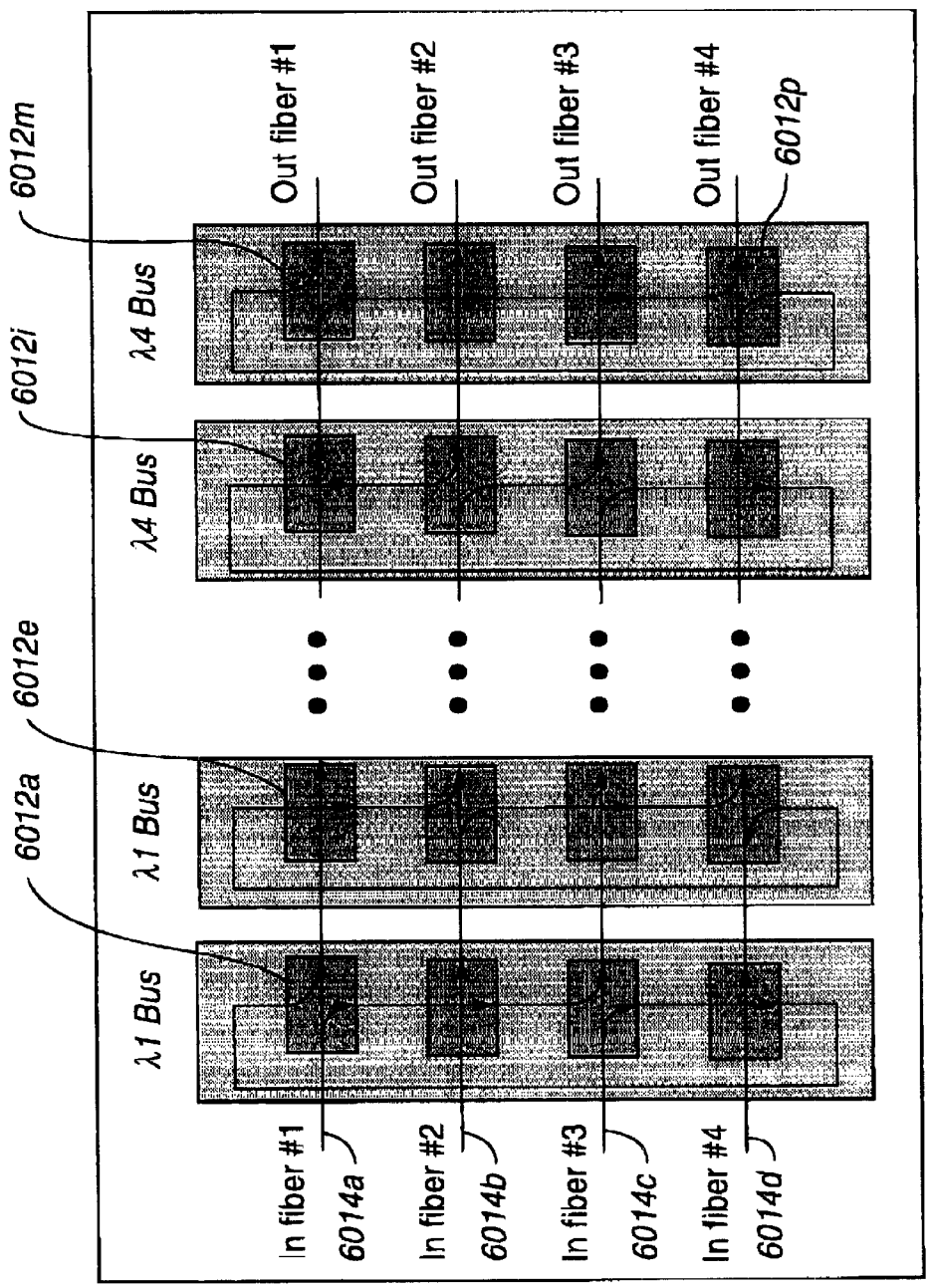
FIG. 6 shows a wavelength crossbar using an array of add/drop wavelength switches according to an embodiment of the present invention.

A "wavelength crossbar" based on this add/drop wavelength switch is illustrated In FIG. 6. Multiple add/drop wavelength switches 6012a–6012p are cascaded to perform arbitrary wavelength channel exchange between multiple WDM networks. In this example, four fibers 6014a–d enter the wavelength crossbar. Each fiber carries four WDM wavelength channels for a total of 16 input channels. By controlling that state of each add/drop switch 6012a–6012p (e.g. by providing a control bit to each switch), each of the four wavelength buses (designated "n bus" In FIG. 6) can exchange one of the optical channels between two of the fibers. In the case of arbitrary wavelength exchange, three wavelength buses are needed for each optical channel. Thus to permit arbitrary wavelength exchange among the 16 input channels, a total of 8 wavelength busses are used, each bus having 4 add/drop switches, for a total of 32 switches. It should be understood that each wavelength bus can handle a single wavelength channel or a contiguous group of channels. This feature is believed to be not available with other technologies.

In light of the above description a number of advantages of the present invention can be seen. The present invention achieves optical add/drop switching using only optical and solid state electronic components, and particularly without the need for moving or mechanical components. The present device provides for long average lifetime and low power consumption. The present device provides low cross-talk such as less than about −25 dB. The present invention can be provided without the need for Filter Bragg Gratings or array-waveguide-grating filters. The present invention can achieve operation in which the add/drop operation is not necessarily always on. The present invention is easily controllable and switchable between a bridge configuration and an add/drop configuration, preferably by controlling solid state electronic devices such as polymer polarization rotators and/or liquid crystal polarization controllers and preferably in response to simple control signals such as using a single bit for controlling switching between a bridge configuration and an add/drop configuration. The present invention can provide optical add/drop wavelength switches which are physically small in lateral and three-dimensional size. The present invention can enable and facilitate effective and efficient optical token ring systems (e.g. for circulating optical channels in a WDM network). The present invention can provide wavelength crossbar functionality for exchanging any optical channels from multi-channel inputs (such as fiber optic inputs) e.g. between fibers in any desired fashion so that any two input channels (or more) can be exchanged with each other for providing to output ports or fibers.

A number of variations and modifications of the invention can be used. In general, the depicted vertical and horizontal polarizations can be switched with one another. The switches can be configured to accommodate more or fewer channels or groups of channels than those depicted. Although the embodiments depict configurations which are generally linear from input ports to output ports, the components can be arranged (with appropriate redirection components such as prisms, mirrors and the like) to define L-shaped, U-shaped or other light paths. Because of the generally symmetric nature of components in at least some configurations, it may be useful to redirect some or all signal paths to pass through components more than once so as to reuse some or all components. It may be useful, in some embodiments, to employ components in an order different from that depicted. In general, it is possible to use some features of the invention without using others such as providing add/drop functionality without the final step of combining spatially-separated vertically and horizontally polarized components (e.g. when the output is to be provided to another switch which can make use of already-separated vertically and horizontally polarized components, e.g. in a crossbar multi-switch configuration).

What is claimed is:

1. An optical network, comprising:
   a plurality of interconnected add/drop nodes for processing at least one input optical signal comprising a plurality of wavelength channels and at least one add signal comprising at least one wavelength channel, wherein:
- at least one of the add/drop nodes is configured in an add/drop state to (a) extract from the plurality of wavelength channels in the input optical signal a first subset of wavelength channels and form a pass-through optical signal comprising a second subset of wavelength channels that is complementary to the first subset of wavelength channels and (b) add to the pass-through optical signal an add signal comprising an add set of wavelength channels that is complementary to the second subset of optical channels, wherein during the add/drop state the pass-through optical signal flows continuously through the add/drop node; and
- at least one of the add/drop nodes is configured in a bridge state to output the input optical signal and the add signal out of different output ports and wherein, when an add/drop node changes from the add/drop state to the bridge state or from the bridge state to the add/drop state, at least a portion of the plurality of wavelength channels flows continuously through-the add/drop node.

2. The optical network of claim 1, wherein each of the add/drop nodes includes a single add/drop switch.

3. The optical network of claim 1, wherein each of the add/drop nodes is free of cascading.

4. The optical network of claim 1, wherein the first subset of wavelength channels includes multiple contiguous channels and the flow of at least a portion of the plurality of wavelength channels through a node is not interrupted when the node is in the add/drop state.

5. The optical network of claim 1, wherein at least a particular one of the add/drop nodes comprises:
- a first input port that receives the at least one input optical signal;
- a second input port that receives the add signal;
- at least a first output port; and
- a switch being switchable between the add/drop state and a bridge state in response to a control signal, wherein, in the add/drop state, the switch extracts the first subset of wavelength channels from the at least one input optical signal and propagates the second subset of wavelength channels as the pass-through signal, combines the pass-through signal with the add signal to form a combined optical signal output through the first output port and, in the bridge state, the switch outputs the first subset of wavelength channels and the second subset of wavelength channels of the at least one input optical signal through the first output port.

6. The optical network of claim 5, wherein the at least a particular one of the add/drop nodes comprises at least a second output port that is spatially displaced from the first output port, wherein, in the add/drop state, the second output port outputs a drop signal including the first subset of wavelength channels in the at least one input optical signal and, in the bridge state, the second output port outputs the add signal.

7. The optical network of claim 6, wherein the switch comprises:
- at least a first optical filter that receives at least a portion of the at least one input optical signal and provides, at least substantially simultaneously, an optical output in which the first subset of wavelength channels has a polarization different from the second subset of wavelength channels;
- at least a first displacement member that receives the optical output and provides the pass-through and drop signals, said drop signal comprising the first subset of wavelength channels and wherein the pass-through and drop signals are spatially displaced with respect to one another;
- at least a first polarization rotator switchable between the bridge state and the add/drop state, wherein, in the bridge state, the polarizations of the pass-through signal and the drop signal are either both rotated or both unrotated and, in the add/drop state, the polarization of one of the pass-through and drop signals is not rotated; and
- at least a first combining member which displaces the add signal into at least substantial alignment with the pass-through signal when the first polarization rotator is in the add/drop state and wherein the add signal is not in at least substantial alignment with the pass-through signal when the first polarization rotator is in the bridge state.

8. A method for optical add/drop switching, comprising:
- receiving, at a first input port, at least a first optical input comprising at least first and second wavelength range components, corresponding, respectively, to first and second wavelength ranges;
- receiving, at a second input port, an optical add signal comprising at least the first wavelength range;
- receiving at least one add/drop control signal;
- in response to the add/drop control signal, extracting said first wavelength range component from the first optical input to form a pass-through signal comprising the second wavelength range component;
- receiving, at the first input port, at least a second optical input including at least third and fourth wavelength range components corresponding, respectively, to third and fourth wavelength ranges;
- receiving, at the second input port, an optical add signal including at least the third wavelength range;
- receiving at least one bridge control signal; and
- in response to the bridge control signal, outputting said second optical input and said optical add signal through spatially displaced outputs.

9. The method of claim 8, wherein the pass-through signal is combined with the add signal.

10. The method of claim 8, wherein, in said bridge and add/drop states the first wavelength range component and add signal have different polarizations.

11. The method of claim 9, wherein, in the add/drop state, the add signal is displaced into at least substantial alignment with respect to the pass-through signal and the first wavelength range component is displaced out of at least substantial alignment with respect to the pass-through signal.

12. An optical add/drop wavelength switch, comprising:
- a first input port that receives at least a first optical input including at least first and second wavelength range components corresponding, respectively, to first and second wavelength ranges;
- a second input port that receives an optical add signal including at least the first wavelength range;
- at least a first output port;
- a switch fabric being switchable between an add/drop mode and a bridge mode in response to a control signal, wherein, in the add/drop mode, the switch fabric extracts said first wavelength range component from the first optical input and propagates the second wavelength range component as a pass-through signal, combines the pass-through signal with the add signal to form a combined optical output, and outputs the combined optical output through the first output port and, in the bridge mode, the switch fabric outputs the first and second wavelength range components of said first optical input through said first output port; and at least a second output port that is spatially displaced from the first output port, wherein, in the add/drop mode, the second output port outputs the first wavelength range component and, in the bridge mode, the second output port outputs the add signal.

13. The optical add/drop wavelength switch of claim 12, wherein the switch fabric comprises:

at least a first optical filter that receives at least a portion of the at least a first optical input and provides, at least substantially simultaneously, an optical output in which the first wavelength range component has a polarization different from the second wavelength range component;

at least a first displacement member that receives the optical output and provides the pass-through and drop signals, said pass-through signal comprising the second wavelength range component and said drop signal comprising the first wavelength range component and wherein the pass-through and drop signals are spatially displaced with respect to one another;

at least a first polarization rotator switchable between the bridge mode and the add/drop mode, wherein, in said bridge mode, the polarization of said pass-through signal and drop signal are either both rotated or both unrotated and, in said add/drop mode, the polarization of one of said pass-through and drop signals is not rotated; and at least a first combining member which displaces the add signal into at least substantial alignment with said pass-through signal when said first polarization rotator is in the add/drop mode and wherein the add signal is not in at least substantial alignment with said pass-through signal when said first polarization rotator is in the bridge mode.

14. The optical add/drop wavelength switch of claim 13, wherein the first optical filter includes a plurality of stacked birefringent elements.

15. The optical add/drop wavelength switch of claim 13, wherein the first displacement member includes a polarization beam separator.

16. The optical add/drop wavelength switch of claim 12, wherein the switch fabric comprises:

at least a first polarization separator for receiving the first optical input and spatially separating the first optical input into an optical signal component with a first polarization and an optical component with a second, different polarization.

17. The optical add/drop wavelength switch of claim 16, wherein the switch fabric comprises:

an optical signal polarization rotator for changing the polarization of one of said first and second optical signal components.

18. The optical add/drop wavelength switch of claim 17, wherein the switch fabric comprises:

at least a first add signal polarization separator for receiving the add signal and spatially separating the add signal into a first add signal component with a first polarization and a second add signal component with a second, different polarization.

19. The optical add/drop wavelength switch of claim 18, wherein the switch fabric comprises:

an add signal polarization rotator for changing the polarization of one of said first and second add signal components.

20. The optical add/drop wavelength switch of claim 19, wherein at least one of said optical signal polarization rotator and said add signal polarization rotator is controllable between a first state, changing a horizontal polarization to a vertical polarization, and a second state, changing a vertical polarization to a horizontal polarization.

21. The optical add/drop wavelength switch of claim 20, wherein at least one of said optical signal polarization rotator and said add signal polarization rotator is controlled to change state whenever said first polarization rotator is controlled to change state.

22. An optical add/drop switch, comprising:

a first input port for receiving at least a first optical input including at least first and second wavelength range components corresponding to first and second wavelength ranges, respectively;

a second input port for receiving an optical add signal including at least the second wavelength range;

means for receiving at least one add/drop control signal;

means for extracting said first wavelength range component from the first optical input in response to the at least one add/drop control signal, such that the second wavelength range component forms a pass-through signal in response to the add/drop control signal;

means for combining the pass-through signal with the add signal in response to the add/drop control signal; and wherein the first input port receives at least a second optical input including at least third and fourth wavelength range components corresponding to third and fourth wavelength ranges, respectively, and the second input port receives a second optical add signal including at least the third wavelength range and further comprising, in response to a bridge control signal, means for outputting said second optical input and said second optical add signal through separate outputs.

23. An optical add/drop wavelength device, comprising:

at least a first input port for receiving at least a first optical input, the first optical input including first and second wavelength ranges;

at least a second input port for receiving at least a first optical add signal, the first optical add signal including at least the first wavelength range;

an optical switch in communication with the first and second input ports, the switch being configured in an add/drop mode to extract the first wavelength range from the first optical signal to form a pass-through optical signal comprising the second wavelength range, and to add the add signal to the pass-through optical signal to form a combined optical output, wherein in the add/drop mode the pass-through optical signal passes continuously through the switch;

at least a first output port wherein, in the add/drop mode, the first output port outputs the combined optical output and, in a bridge mode, the first optical output outputs the first optical input; and at least a second output port that is spatially displaced from the first output port, wherein, in the add/drop mode, the second output port outputs the first wavelength range component of the first optical input and, in the bridge mode, the second output port outputs the add signal.

24. The optical add/drop wavelength device of claim 23, wherein the switch comprises:
- at least a first optical filter that receives at least a portion of the at least a first optical input and provides, at least substantially simultaneously, an optical output in which the first wavelength range of the at least a first optical input has a polarization different from the second wavelength range of the at least at a first optical input;
- at least a first displacement member that receives the optical output and provides the pass-through signal and a drop signal comprising the first wavelength range and wherein the pass-through and drop signals are spatially displaced with respect to one another;
- at least a first polarization rotator switchable between the bridge mode and the add/drop mode, wherein, in said bridge mode, the polarization of said pass-through signal and drop signal are either both rotated or both unrotated and, in said add/drop mode, the polarization of one of said pass-through and drop signals is not rotated; and
- at least a first combining member which displaces the add signal into at least substantial alignment with said pass-through signal when said first polarization rotator is in the add/drop mode and wherein the add signal is not in at least substantial alignment with said pass-through signal when said first polarization rotator is in the bridge mode.

25. The optical add/drop wavelength device of claim 24, wherein the first optical filter includes a plurality of stacked birefringent elements.

26. The optical add/drop wavelength device of claim 24, wherein the first displacement member includes a polarization beam separator.

27. The optical add/drop wavelength device of claim 24, wherein the switch comprises:
- at least a first polarization separator for receiving the first optical input and spatially separating the first optical input into an optical signal component with a first polarization and an optical signal component with a second, different polarization.

28. The optical add/drop wavelength device of claim 27, wherein the switch comprises:
- an optical signal polarization rotator for changing the polarization of one of said first and second optical signal components.

29. The optical add/drop wavelength device of claim 28, wherein the switch comprises:
- at least a first add signal polarization separator for receiving the add signal and spatially separating the add signal into a first add signal component with a first polarization and a second add signal component with a second, different polarization.

30. The optical add/drop wavelength device of claim 29, wherein the switch comprises:
- an add signal polarization rotator for changing polarization of one of said first and second add signal components.

31. The optical add/drop wavelength device of claim 30, wherein at least one of said optical signal polarization rotator and said add signal polarization rotator is controllable between a first state, changing a horizontal polarization to a vertical polarization, and a second state, changing a vertical polarization to a horizontal polarization.

32. The optical add/drop wavelength device of claim 31, wherein at least one of said optical signal polarization rotator and said add signal polarization rotator is controlled to change state whenever said first polarization rotator is controlled to change state.

33. A method for optical add/drop switching, comprising:
- receiving, at a first input port, at least a first optical input, the first optical input comprising first and second wavelength ranges;
- receiving, at a second input port, at least a first optical add signal, the optical add signal including at least the first wavelength range;
- extracting the first wavelength range from the first optical signal to form a pass-through optical signal comprising the second wavelength range;
- combining the pass-through optical signal with the add signal, wherein in the extracting and combining steps, the second wavelength range of the first optical input signal flows continuously along an optical path;
- receiving, at the first input port, at least a second optical input including at least third and fourth wavelength range components;
- receiving, at the second input port, an optical add signal including at least the third wavelength range;
- receiving at least one bridge control signal; and
- in response to the bridge control signal, outputting said second optical input and said optical add signal through spatially displaced outputs.

34. The method of claim, 33, wherein the pass-through signal is combined with the add signal.

35. The method of claim 33, wherein, in an add/drop state, the add signal is displaced into alignment with the pass-through signal and the first wavelength range component of the first optical signal is displaced out of alignment with the pass-through signal.

36. An optical add/drop switch, comprising:
- at least a first input port which receives at least a first optical input;
- at least a second input port which receives an optical add signal;
- at least a first optical filter which receives at least a portion of said first optical signal and provides a differentiated signal in which at least a first wavelength range has a polarization different from other wavelengths of said first optical signal;
- at least a first displacement member which receives said differentiated signal and provides a member first output and a member second output, said member first output including said first wavelength range, said member second output including said other wavelengths and wherein said member first and second outputs are spatially displaced with respect to one another;
- at least a first polarization rotator switchable between an add/drop state and a bridge state, wherein, in said bridge state, the polarization of said member first and second outputs are either both rotated or both unrotated and, in said add/drop state, the polarization of one of said member first and second outputs is rotated and the polarization of the other of said first and second outputs is not rotated; and
- at least a first combining member which displaces said add signal into at least substantial alignment with said member second output when said first polarization rotator is in said add/drop state and wherein said add signal is not in at least substantial alignment with said member second output when said first polarization rotator is in said bridge state.

37. The optical add/drop switch of claim 36, wherein the first optical filter includes a plurality of stacked birefringent elements.

38. The optical add/drop switch of claim 36, wherein the first displacement member includes a polarization beam separator.

39. The optical add/drop switch of claim 36, wherein the switch comprises:
at least a first polarization separator for receiving the first optical input and spatially separating the first optical input into an optical signal component with a first polarization and an optical signal component with a second, different polarization.

40. The optical add/drop switch of claim 39, wherein the switch comprises:
an optical signal polarization rotator for changing the polarization of one of said first and second optical signal components.

41. The optical add/drop switch of claim 40, wherein the switch comprises:
at least a first add signal polarization separator for receiving the add signal and spatially separating the add signal into a first add signal component with a first polarization and a second add signal component with a second, different polarization.

42. The optical add/drop switch of claim 41, wherein the switch comprises:
a polarization rotator for changing the polarization of one of said first and second add signal components.

43. The optical add/drop switch of claim 42, wherein at least one of said optical signal polarization rotator and said add signal polarization rotator is controllable between a first state, changing a horizontal polarization to a vertical polarization, and a second state, changing a vertical polarization to a horizontal polarization.

44. The optical add/drop switch of claim 43, wherein at least one of said optical signal polarization rotator and said add signal polarization rotator is controlled to change state whenever said first polarization rotator is controlled to change state.

45. An optical add/drop switch, comprising:
at least a first input port which receives at least a first optical input;
at least a second input port which receives an optical add signal;
at least a first polarization separator for receiving at least said first optical input and spatially separating said first optical input into a first optical signal component with a first polarization and a second optical signal component with a second, different polarization;

at least a first optical filter which receives at least a portion of each of said first and second optical signal components and provides corresponding differentiated optical signals in which at least a first wavelength range has a polarization different from other wavelengths of said first and second optical signal components;

at least a second polarization separator for receiving at least said add signal and spatially separating said add signal into a first add signal component with a first polarization and a second add signal component with a second, different polarization;

at least a first displacement member which receives at least one of said differentiated optical signals and at least one of said first and second add signal components and provides at least member first, second, and third outputs, said member second and third outputs including said first wavelength range and said member first output including said other wavelengths, and wherein said member first, second, and third outputs are spatially displaced with respect to one another;

at least a first polarization rotator switchable between an add/drop state and a bridge state, wherein, in said bridge state, the polarization of said member first, second, and third outputs are either both rotated or both unrotated and, in said add/drop state, the polarization of one of said member first and second outputs is rotated and the polarization of the other of said first and second outputs and said member third output is not rotated; and at least a first combining member which displaces said at least one of said first and second add signal components into at least substantial alignment with said member first output when said first polarization rotator is in said add/drop state and wherein said at least one of said first and second add signal components is not in at least substantial alignment with said member first output when said first polarization rotator is in said bridge state.

* * * * *